United States Patent [19]
Klie et al.

[11] Patent Number: 4,690,038
[45] Date of Patent: Sep. 1, 1987

[54] HYDRAULICALLY ACTUATED PISTON MACHINE WITH BEARING FOR CONNECTING PISTON TO PISTON ROD

[75] Inventors: Jürgen Klie; Rudolf Beyer, both of Sprockhövel, Fed. Rep. of Germany

[73] Assignee: G. Dusterloh, GmbH, Sprockhövel, Fed. Rep. of Germany

[21] Appl. No.: 817,358

[22] Filed: Jan. 9, 1986

[30] Foreign Application Priority Data

Jan. 9, 1985 [DE] Fed. Rep. of Germany ....... 3500451

[51] Int. Cl.$^4$ .......................... F01B 31/00; F16J 1/14; F16J 1/04
[52] U.S. Cl. .................................... 92/181 R; 92/157; 92/187; 92/216; 92/220; 92/238
[58] Field of Search ..................... 92/129, 157, 187 R, 92/187, 189, 190, 216, 220, 238, 256, DIG. 2; 91/488

[56] References Cited

U.S. PATENT DOCUMENTS

| | | | |
|---|---|---|---|
| 1,308,499 | 7/1919 | Kutchenreiter | 92/187 X |
| 1,878,574 | 9/1932 | Blundell | 92/157 X |
| 1,898,169 | 2/1933 | Bovard | 92/157 X |
| 2,108,532 | 2/1938 | Frelin | 92/157 X |
| 2,128,065 | 8/1938 | Aikman | 92/157 X |
| 2,299,430 | 10/1942 | Sexton | 92/129 X |
| 2,372,050 | 3/1945 | Barraja-Fraunfelder et al. | 92/157 |
| 2,926,975 | 3/1960 | Karde et al. | 92/157 |
| 3,136,306 | 6/1964 | Kamm | 92/157 X |
| 3,188,973 | 6/1965 | Firth et al. | 92/129 |
| 3,983,793 | 10/1976 | Beardmore | 92/190 |
| 4,358,881 | 11/1982 | Mahrus et al. | 92/190 X |

OTHER PUBLICATIONS

Projektblatt RM 1-002 of the Company G. Dusterloh, G.m.b.H. 4322 Sprockhovel, Federal Republic of Germany.
Friedrichs, I. "Langsamlaufende Hydraulikmotoren mit Automatischem Verschleibausgleich," *Asr–Digest Fur Angewande Antriebstechnik*, 10:28, Oct. 1975.

Primary Examiner—Robert E. Garrett
Assistant Examiner—George Kapsalas
Attorney, Agent, or Firm—Michael J. Striker

[57] ABSTRACT

A piston machine, particularly a hydraulically-actuated piston machine, comprises at least one cylinder having an axis, a piston axially slidable in the cylinder and having a piston bottom with an inner surface, a piston rod turnably connected with the piston and having a piston rod shaft, a turning member mounted on the piston rod and having a side which is opposite to the piston rod shaft and has a convex circular surface, a pressing member having a shell surface which is in sliding contact with the circular surface of the turning member, the pressing member having a side which is opposite to the turning member and is provided with a convex circular surface abutting against the inner surface of the piston bottom, the circular surface of the pressing member and one of the circular surfaces of the turning member and the shell surface of the pressing member having central axes with central axes projections along their common orthogonals forming an angle of approximately 90°.

19 Claims, 5 Drawing Figures

HYDRAULICALLY ACTUATED PISTON MACHINE WITH BEARING FOR CONNECTING PISTON TO PISTON ROD

BACKGROUND OF THE INVENTION

1. Field of the Invention

The present invention relates to a piston machine and more particularly to a hydraulically actuated piston machine with a cylinder, and a piston turnably connected with a piston rod and axially sliding in the cylinder.

2. Description of the Prior Art

Piston machines of the above-mentioned general type are known in the art. In one such piston machine design in accordance with the piston-piston rod principle (Projektblatt RM 1-002 of the company G. Dusterloh, G.m.b.H. 4322 Sprockhovel, Federal Republic of Germany), the piston force is transmitted via a cylindrical pin to the piston rod. The pin is fixedly connected with the piston and slides in an opening which is provided in a piston rod shaft transversely to the directional movement of the piston and is a so-called piston rod eye. The piston rod shoe abuts on an eccentric of the crank shaft.

Piston machines of this construction have the advantage that relatively low friction forces take place and also the relative speeds of the structural elements in sliding contact are substantially uniform at all locations. Finally the wear in the contact zones is approximately uniform. The disadvantage of this construction is, however, that more or less unavoidable failure in the parallelism of the central axes of the piston rod eye, on the one hand, and the crank shaft, on the other hand, cannot be compensated. Thereby it is impossible to provide an unobjectionable guidance. By inclined running there is increased leakage as well as a non-uniform wear. This can lead to operational disability because of, for example, piston seizure.

For avoiding the above mentioned deficiencies extremely high manufacturing accuracy is required.

In a piston machine in accordance with the another embodiment (Magazine "Asr-Digest Fur Angewande Antriebstechnik" Vol. 10, October 1975, page 28, FIG. 2), the piston force is transferred via a spherical joint to the piston rod. Here a ball is arranged on the piston rod shaft and slides in a piston recess corresponding to the ball. The advantage of this construction is that the parallelism error cannot here have any negative influence, since the joint can be adjusted in all directions freely about its center. The manufacturing requirements are therefore lower. However, as compared with the cylindrical connection, higher friction forces arise. These friction forces are especially significant when the ball is flattened in the region of the central axis of the piston rod to allow passage of pressure medium to an unloading field. In this case the piston force can be transferred only over a spherical ring-shaped contact zone. As a result of this high centrally acting forces are provided which consequently cause high friction forces. The efficiency of the piston is considerably decreased. Moreover there is here also the disadvantage that because of the different relative speed in the contact zone, a non-uniform wear of the spherical surfaces is caused.

Both above-described construction of the piston machines in accordance with the piston-piston rod principle are characterized by the fact that the joint especially in highly loaded machines is subjected to high surface pressure. The resulting high wear and reduced service life cannot be avoided by the utilization of extremely high loadable materials. Furthermore, it is also of the disadvantage that with high wear, the piston, the piston rod and the piston pins must be replaced, while a repair of the worn hinge is not possible or in some cases cannot be done with reasonable expenses. Finally, another disadvantage is that in both above-described embodiments the radial forces take place which are effective for progressive wear in direction of widening the piston rod opening or the piston skirt.

SUMMARY OF THE INVENTION

Accordingly, it is an object of the present invention to provide a piston machine which avoids the disadvantages of the prior art.

More particularly, it is an object of the present invention to provide a piston machine which combines the advantages of the spherical joint connection with the advantages of the cylindrical joint connection and in which all sliding parts of the joint connection are designed to be easily changeable.

In keeping with these objects and with others which will become apparent hereinafter, one feature of the present invention resides, briefly stated, in a piston machine, particularly a hydraulically actuated piston machine which comprises at least one cylinder having an axis, a piston axially slidable in the cylinder and having a piston bottom with an inner surface, a piston rod turnably connected with the piston and having a piston rod shaft, a turning member mounted on the piston rod and having a side which is opposite to the piston rod shaft and has a convex circular surface, a pressing member having a shell surface which is in sliding contact with the circular surface of the turning member, the pressing member having a side which is opposite to the turning member and is provided with a convex circular surface abutting against the inner surface of the piston bottom, the circular surface of the pressing member and one of the circular surfaces of the turning member and the shell surface of the pressing member having central axes with central axes projections along their common orthogonals forming an angle of approximately 90°.

When the piston machine is designed in accordance with these features its construction is simple and cost-favorable. Only worn joint parts need be replaced while the piston or the piston rod must not be replaced.

A further advantage is that regardless of the requirements to the material for the piston and the piston rod, specific materials can be selected in accordance with the requirements to joint bearing so as to transfer maximum surface pressure. This is especially important that with the above-described wear neither an elastic widening of the piston skirt, nor deformations of the piston rod take place.

The piston rod is connected at its shaft end with the turning member, advantageously in a releasable manner. The connection can be by screws which extend both from the turning member into the piston rod shaft and from the piston rod shaft into the turning member. Riveting connection is also possible. The turning member lies with its convexly curved circular surface in a shell surface of the pressing member supported on the piston bottom, in a formlocking manner. The pressing member transfers the piston forces to the turning member. When the crank shaft turns, sliding movements take place between the turning member and the pressing member. In the event of a parallelism error of the central axes of the circular surface of the turning member on the one hand, and the crank shaft on the other hand, the piston is in the position to perform adjusting movements transverse to its turning axis. Thereby an extremely friction-free rolling of the circular surface of the pressing member on the inner surface on the piston bottom takes place.

In accordance with another feature of the present invention, the contact surfaces of the turning member and the pressing member are formed cylindrical. The cylindrical contact surfaces can be manufactured in a relatively simple manner.

For providing exact axial guidance of the turning member and thereby the piston rod, no special running surfaces are required when in accordance with still another feature of the present invention, the contact surfaces of the turning member are barrel-shaped.

The inner surface of the piston bottom can be formed completely flat. When then the circular surface of the pressing member is cylindrical, the pressing member is supported on the piston bottom linearly.

In accordance with a further feature of the invention, the inner surface of the piston bottom corresponds to the cylindrical circular surface of the pressing member, so that the sliding movements are possible for compensation of for example manufacturing inaccuracies.

For allowing in hydrostatic piston machines a pressure supply of the unloading field in the piston rod shoe, passages are formed in the piston bottom, the turning member, the pressing member, and the piston rod shaft in correspondence with one another. In this manner the respective working medium can flow from the cylindrical chamber to the unloading field in the piston shoe.

When the respective supply with the working medium is required, the mounting means for the turning member can be provided with a through-opening. In this case it forms a component of the pressure supply passages.

For reducing the Hertzian strees to the lowest possible level, it is advantageous to allow action of the pressure of the working medium in the cylinder chamber over the total circular surface of the pressing member. In this case a substantial force unloading is performed. For this purpose a chamber which is formed by the circular surface of the pressing member, the inner surface of the piston bottom, and the piston skirt can communicate via at least one passage. The flow of the working medium from the passages in the chamber can be performed through grooves which are provided in the circular surface of the pressing member.

Another possibility is to connect the above-mentioned chamber with the cylinder chamber by at least one passage in the piston bottom. In this case this chamber is directly connected with the cylinder chamber. The connecting passage can stand parallel to the passages which communicate the cylinder chamber with the unloading field in the piston rod shoe.

For avoiding an increase in the leakage, the pressing member can be guided with its periphery sealingly in a cylindrical recess in the piston skirt.

This advantageous feature can be further improved when for sealing the gap between the periphery of the pressing member and the recess, an O-ring is used in the machine.

For fixing the piston and the piston rod together with the turning member and the pressing member in mounted condition and for transferring pulling forces between the piston and the piston rod, a centering pin is arranged in the region of the central axis of the circular surface of the turning member or the shell surface of the pressing member and engages with a considerable play into mutually coaxial recesses in the piston skirt. The play between the recesses in the piston skirt and the portions of the centering pin is selected so that the required adjustability is always guaranteed. It is advantageous when the portions engaging in the recesses are formed cylindrical.

Two cylinder head screws can be used as centering pins. The cylinder head screws are screwed coaxially from the end surfaces of the turning member into the latter. The screw heads engage in the recesses of the piston skirt.

Instead of the cylinder head screws, it is also possible to use cylinder pins pressably from the end sides of the turning member into the latter.

Alternatively, it is also possible that only one cylinder pin extends through the turning member over its entire length. Also, this cylinder pin can be fixed in the turning member advantageously by a clamping seat.

Mounting of the centering pin can also be performed with the mounting means which fix the turning member on the piston rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
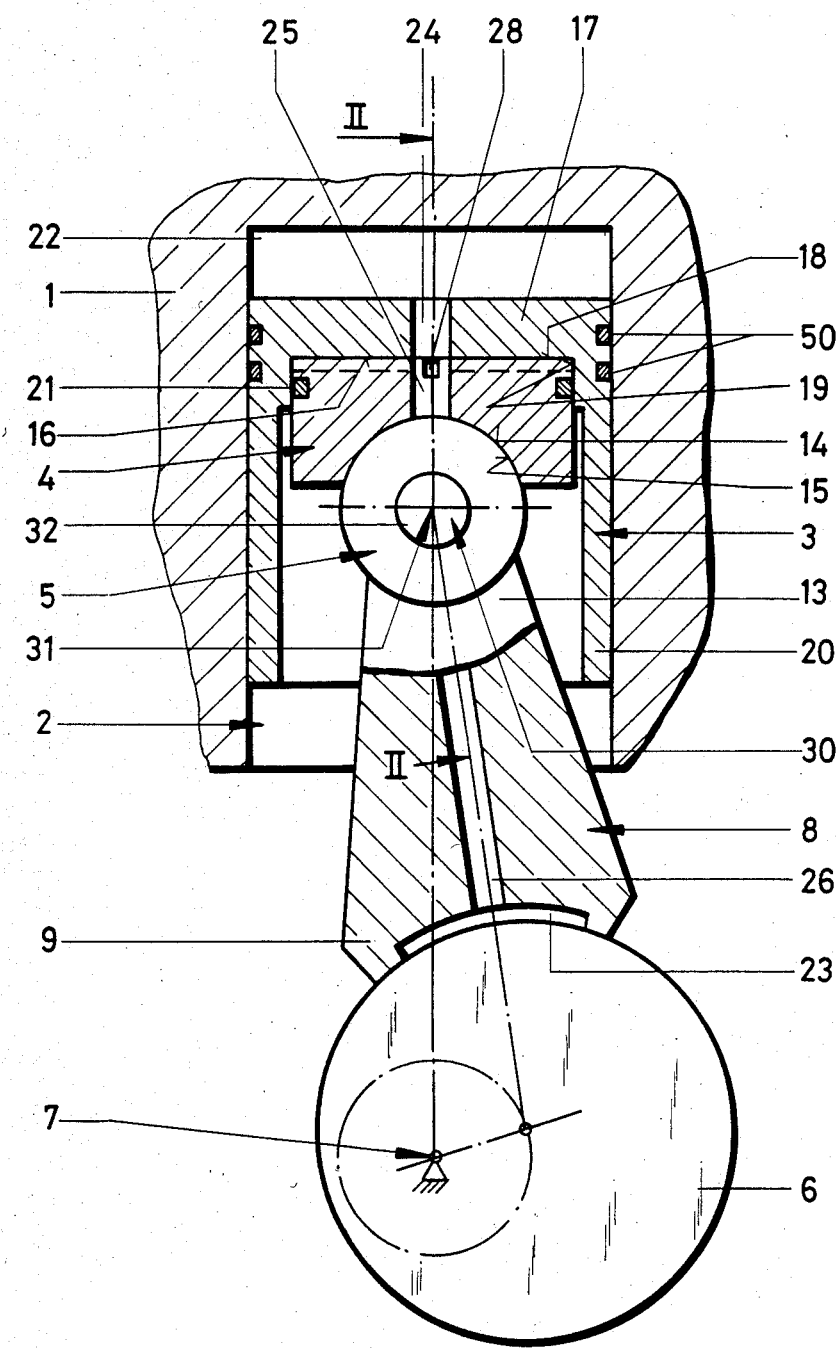
FIGS. 1-5 are views showing a vertical longitudinal cross-section of a cylinder-piston unit of a hydrostatic piston machine, for example a hydrostatic radial piston motor, in accordance with different embodiments of the present invention.

FIGS. 1-5 show a hydrostatic radial piston machine which has a housing identified with reference numeral 1. A plurality of cylinder openings 2 are provided in the housing 1. They are located in a common place and uniformly distributed over the periphery. A hollow piston 3 slides in each cylinder opening and is connected via a pressure member 4, 4a, 4b and a turning member 5, 5a with a piston rod 8 which is supported on an eccentric 6 of a crank shaft 7. The piston rod 8 slides with its piston rod shoe 9 on the eccentric 6, as can be seen in FIG. 1.

Figure 2:
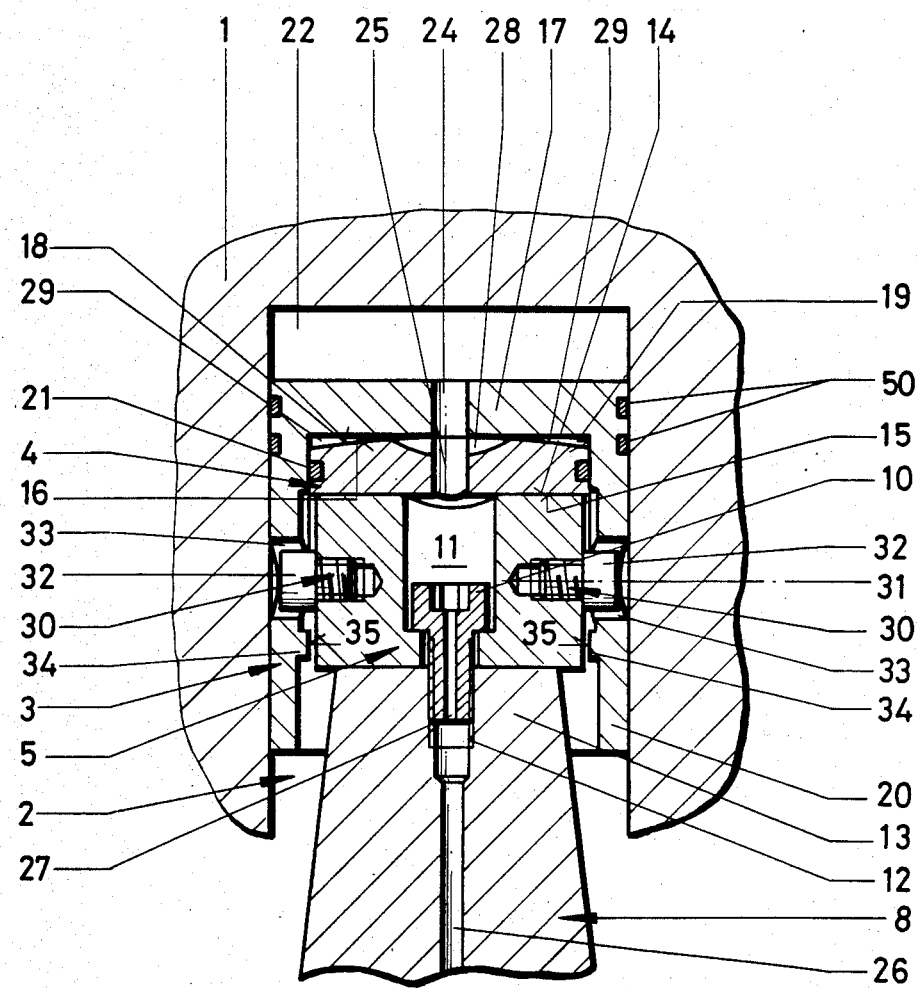

In the embodiment of FIGS. 1 and 2, a cylindrical turning member 5 is mounted on the piston rod 8. The mounting is performed by means of an axially extending screw 10 which is inserted in a stepped opening 11 of the turning body 5 and screwed into a threaded portion 12 of a piston rod shaft 13.

A circular surface 14 of the turning member 5 is in sliding contact at its side facing away of the piston rod 13 with a shell surface 15 corresponding to the surface 14. The pressure member 4 is provided at its sideways facing away of the turning member 5 with a convex circular surface 18 which is supported on an inner surface 16 of a piston bottom 17. The inner surface 16 of the piston bottom 17 is flat. The projection of the central axis of the circular surface 14 and the circular surface 18 along the common orthogonals of the central axes form an angle of approximately 90°.

The cylindrically shaped pressing member 4 is arranged peripherally in a corresponding recess 19 of a piston skirt 20. An O-ring 21 provides for sealing of the gap between the pressing member 4 and the recess 19.

For transporting the working medium from a cylinder chamber 22 to an unloading field 23 in the piston rod 9 (FIG. 1) passages 24, 25, 11 and 26 are provided in the piston bottom 7, in the pressing member 4, in the turning member 5, and in the piston rod shaft 13. An opening 27 in the screw 10 forms a transition passage. The working medium can flow via grooves 28 in the pressing member 4 also into a chamber which is limited by the circular surface 18 of the pressing member 4, the inner surface 16 of the piston bottom 17 and the piston skirt 20. Thereby the Hertz pressure is reduced.

For assembling the piston rod 8 and the piston 3 in the mounting condition as well as for transmitting of pulling forces, cylinder head screws 30 are screwed from the end side of the turning member 5 into the latter. The cylinder head screws 30 extend in a central axis 31 of the circular surface 13 of the turning member 5. Their cylindrical heads 32 engage in mutually coaxial recesses 33 in the piston skirt 20 with a considerable play.

As can be seen particularly from FIG. 2, projections 34 with running surfaces 35 project inwardly from the piston skirt 20 for axial guidance of the turning member 5 as well as the piston rod 8.

Figure 3:
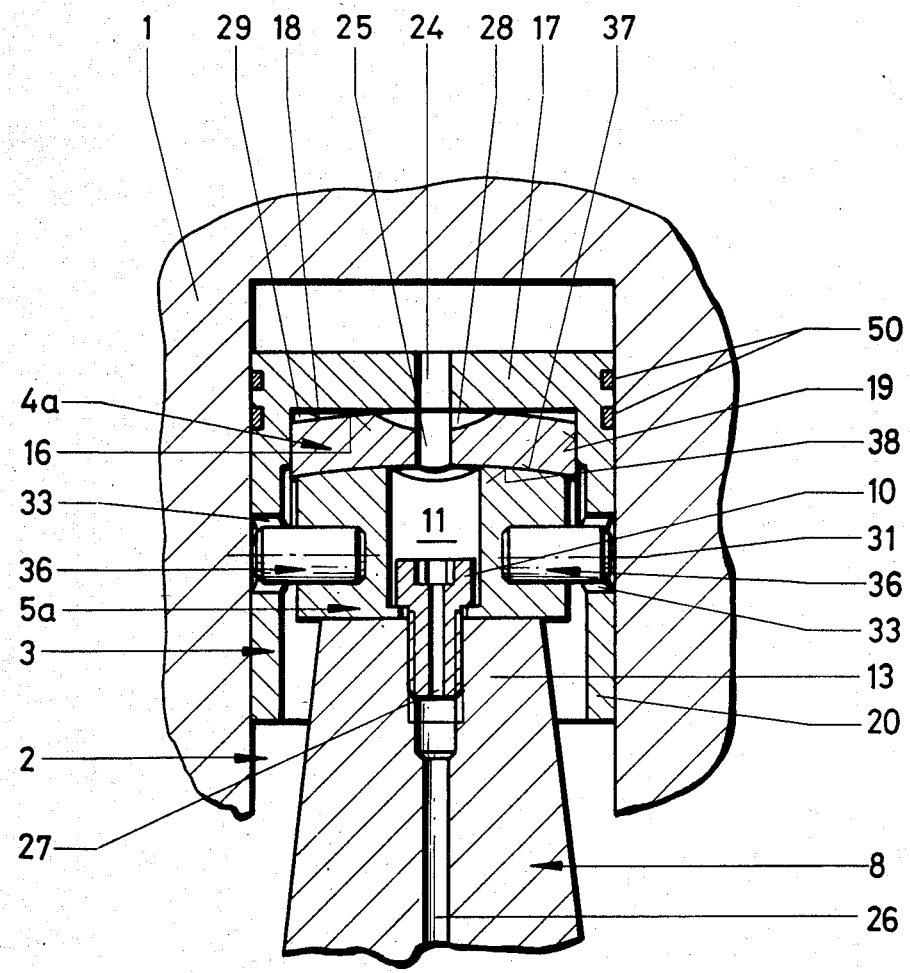

In the embodiment of FIG. 3, cylinder pins 36 are pressed instead of the cylinder head screws 30, into a turning member 5a from its end sides.

It can be seen further, a circular surface 37 of the turning member 5a is barrel-shaped. A shell surface 38 of the pressing member 4a is formed in correspondence with this shape. In this manner the axial running surfaces 35 for the turning body in FIG. 2 can be dispensed with.

The pressing member 4a is inserted peripherally sealingly into the recess 19 in the piston skirt 20. Further sealing means are not utilized. However, they can be provided.

Figure 4:
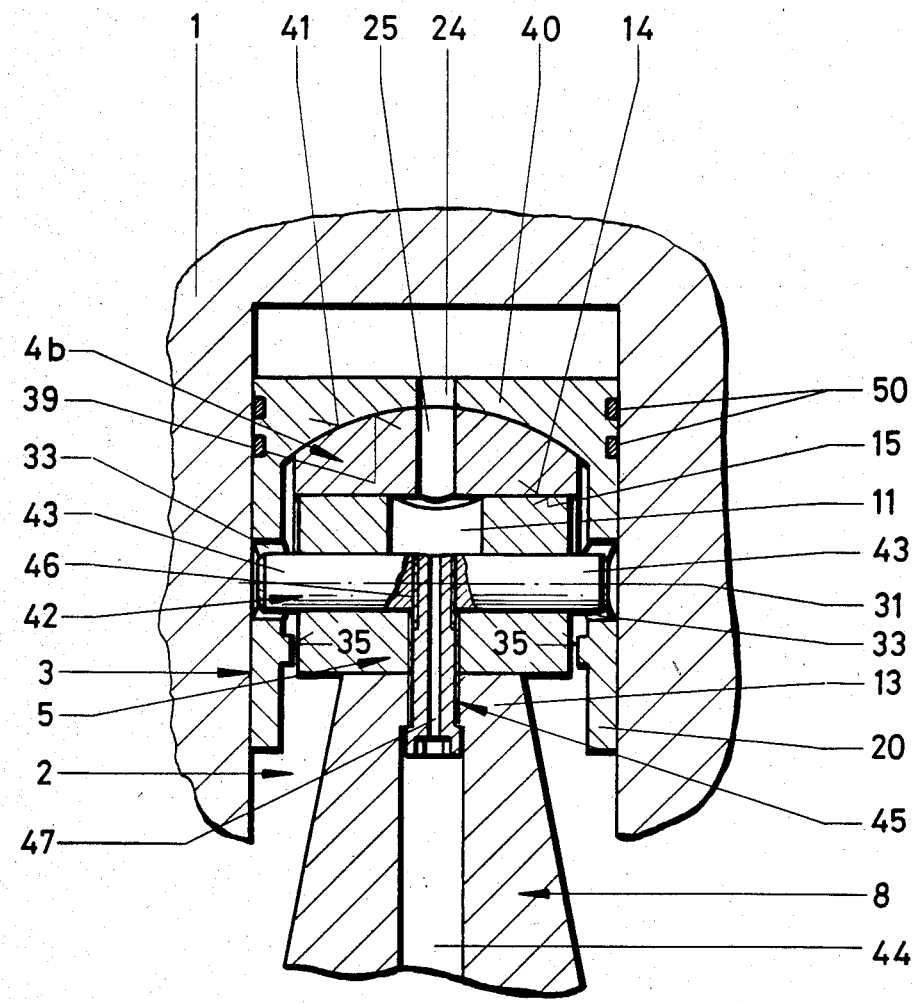

In the embodiment of FIG. 4, the circular surface 14 of the turning member 5 and thereby also the shell surface 15 of a pressing member 4b have again a cylindrical shape. The running surfaces 35 on the piston skirt 20 for the turning member 5 are advantageous. In contrast to the above-described embodiments, here, however, an inner surface 39 of a piston bottom 40 corresponds to a circular surface 41 of the pressing member 4b. As a result of this surface sliding movements between the pressing member 4b and the piston bottom 40 are possible.

Fixation of the turning member 5 on the piston 3 is performed by a cylinder pin 42 extending through the turning member 5 over its entire length. End portions 43 are inserted into the recesses 33 in the piston skirt 20 with a considerable play. A special guidance of the pressing member 4b in the piston 3 is not required because of the concavely curved inner surface 39 of the piston bottom 40.

FIG. 4 also shows a further embodiment with respect to the mounting of the turning member 5 and the cylinder pin 42. In this case a screw 45 extends through an opening 44 of a greater diameter in the piston rod shaft 13 and is inserted into a threaded opening 46 in the cylinder pin 42. In this manner the cylinder pin 42 is arrested in the turning member 5 and the turning member 5 is arrested on the piston rod 8. The screw 45 is also provided with an axial opening 47.

Figure 5:
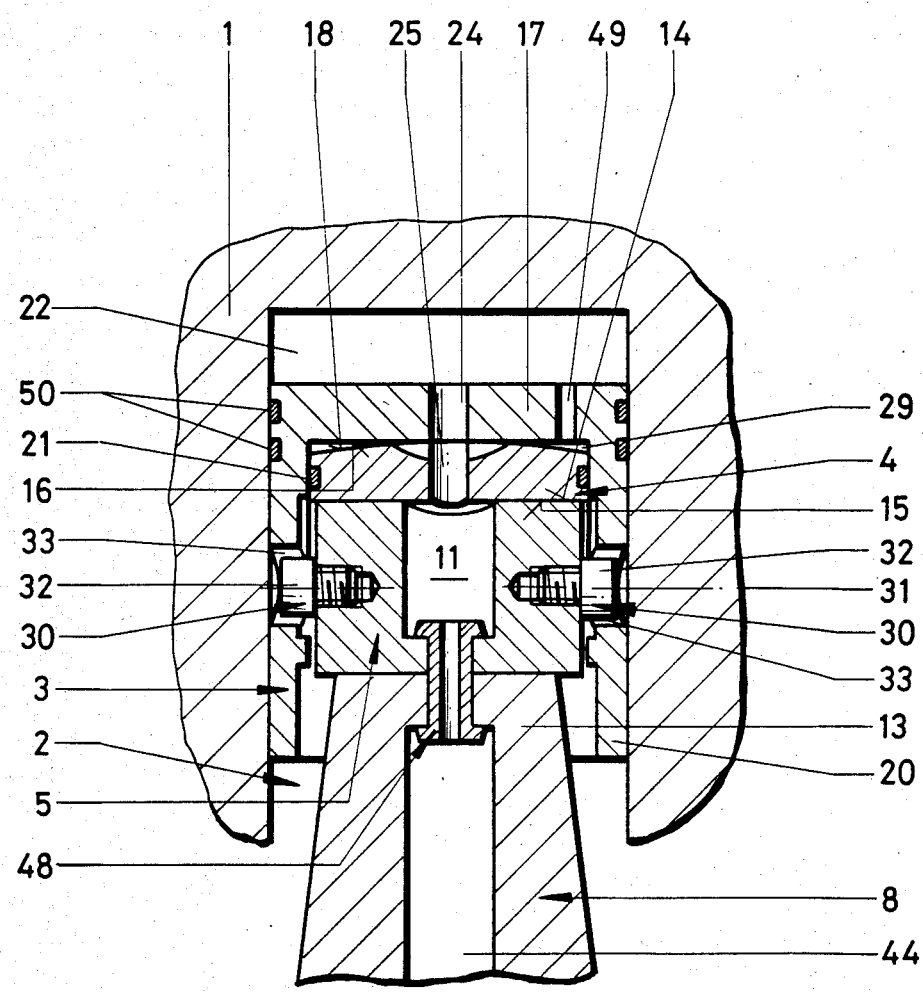

The embodiment of FIG. 5 substantially corresponds to the embodiment of FIGS. 1 and 2. However, the mounting of the turning member 5 on the piston rod 8 is different. Instead of the mounting screws 30, a hollow rivet 48 is provided here. Moreover, it can be seen that the chamber 29 which is limited by the circular surface 18 of the pressing member 4, the inner surface 16 of the piston bottom 17 and the piston skirt 20, is directly connected via at least one passage 49 in the piston bottom 17 with the cylinder chamber 22. In this embodiment the groove formation in the pressing member 4 corresponding to the embodiments of FIGS. 1–3 is dispensed with. The passage 44 in the piston rod shaft 13 corresponds to the respective passage in FIG. 4.

All above described embodiments have a common feature that the gap between the housing 1 and the piston 3 is sealed at the periphery of the piston 3 by a sealing ring 50.

It will be understood that each of the elements described above, or two or more together, may also find a useful application in other types of constructions differing from the types described above.

While the invention has been illustrated and described as embodied in a piston machine, in particular a hydraulically actuated piston machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A piston machine, particularly a hydraulically-actuated piston machine, comprising at least one cylinder having an axis; a piston axially slidable in said cylinder and having a piston bottom with an inner surface; a piston rod turnably connected with said piston and having a piston rod shaft; a turning member mounted on said piston rod and having a side which is opposite to said piston rod shaft and has a convex circular surface; a pressing member having a shell surface which is in sliding contact with said circular surface of said turning member, said pressing member having a side which is opposite to said turning member and is provided with a convex circular surface movably abutting against said inner surface of said piston bottom so that said pressing member is movable both relative to said turning member and to said piston bottom, said circular surface of said pressing member and one of said circular surface of said turning member and said shell surface of said pressing member having central axes with central axes projections along their common orthogonals forming an angle of approximately 90°.

2. A piston machine as defined in claim 1, wherein said turning member is releasably mounted on said piston rod.

3. A piston machine as defined in claim 1, wherein one of said circular surface of said turning member and said shell surface of said pressing member is formed cylindrical.

4. A piston machine as defined in claim 3, wherein said circular surface of said turning member and said shell surface of said pressing member are formed cylindrical.

5. A piston machine as defined in claim 1, wherein one of said circular surface of said turning member and said shell surface of said pressing member is formed barrel-shaped.

6. A piston machine as defined in claim 5, wherein said circular surface of said turning member and said shell surface of said pressing member are formed barrel-shaped.

7. A piston machine as defined in claim 1, wherein said inner surface of said piston bottom is flat.

8. A piston machine as defined in claim 1, wherein said circular surface of said pressing member is cylindrical, said inner surface of said piston bottom corresponding to said cylindrical circular surface of said pressing member.

9. A piston machine as defined in claim 1, wherein said piston bottom, said turning member, said pressing member and said piston rod shaft are provided with passages which are arranged in correspondence with one another.

10. A piston machine as defined in claim 9, wherein said piston has a piston skirt, said circular surface of said pressing member with said inner surface of said piston bottom and said piston skirt together limiting a chamber communicating with at least one of said passages.

11. A piston machine as defined in claim 1; and further comprising means for mounting said turning member and including a mounting element provided with a through-opening.

12. A piston machine as defined in claim 1, wherein said cylinder limits a cylinder chamber, said piston having a piston skirt, said circular surface of said pressing member with said inner surface of said piston bottom and said piston skirt together forming a chamber; and further comprising a passage connecting said chamber with said cylinder chamber.

13. A piston machine as defined in claim 1, wherein said piston has a piston skirt having a recess, said pressing member having a cylindrical periphery inserted into said recess in said piston skirt.

14. A piston machine as defined in claim 13, wherein said periphery of said pressing member forms with said recess a gap which is sealed.

15. A piston machine as defined in claim 1, wherein said piston has a piston skirt provided with coaxial recesses; and further comprising at least one centering pin mounted in said turning member and extending in the region of said central axis of one of said circular surfaces of said turning member and said shell surface of said pressing member, said centering pin engaging into said recesses of said piston skirt with a considerable play.

16. A piston machine as defined in claim 15; and further comprising a second such centering pin, said centering pins being formed as two coaxially arranged cylinder head screws which are screwed in said turning member.

17. A piston machine as defined in claim 15; and further comprising a second such centering pin, said centering pins being formed as cylinder pins which are fixed in said turning member with a pressure fit.

18. A piston machine as defined in claim 15, wherein said centering pin is formed as a cylinder pin which extends through said turning member over its entire length and has end portions engaging in said recesses in said piston skirt.

19. A piston machine as defined in claim 15; and further comprising means for mounting said turning member; said centering pin and said mounting means being connected with one another.

* * * * *